United States Patent [19]

Manning

[11] Patent Number: 4,597,601
[45] Date of Patent: Jul. 1, 1986

[54] ENERGY ABSORBING VEHICLE BUMPER

[75] Inventor: Donald L. Manning, Orchard Lake, Mich.

[73] Assignee: Transpec, Inc., Troy, Mich.

[21] Appl. No.: 712,854

[22] Filed: Mar. 18, 1985

[51] Int. Cl.⁴ .............................................. B60R 19/02
[52] U.S. Cl. ..................................... 293/122; 293/126; 293/133; 293/151
[58] Field of Search ............... 296/110, 120, 121, 122, 296/132, 133, 151

[56] References Cited

U.S. PATENT DOCUMENTS

| | | | |
|---|---|---|---|
| 3,902,748 | 9/1975 | Bank et al. | 293/122 |
| 3,938,841 | 2/1976 | Glance et al. | 293/120 |
| 3,989,292 | 11/1976 | Bank et al. | 293/122 |
| 4,073,528 | 2/1978 | Klie | 293/122 |
| 4,076,296 | 2/1978 | Ditto et al. | 293/122 |
| 4,186,915 | 2/1980 | Zeller et al. | 293/122 |

*Primary Examiner*—Robert R. Song

[57] ABSTRACT

The bumper system of the present invention is of a modular design wherein two substantially identical, laterally extending members are secured at their laterally innermost ends to define an integrated bumper device and wherein each module includes an energy absorbing hollow core element formed of a relatively rigid, though deflectable, high strength plastic material mounted in front of and upon a relatively stiff transverse support beam member which is, in turn, adapted to be secured to a vehicle frame through a suitable rearwardly extending bracket structure and which energy absorbing element and support beam are encapsulated in an elastomeric outer skin layer.

8 Claims, 12 Drawing Figures

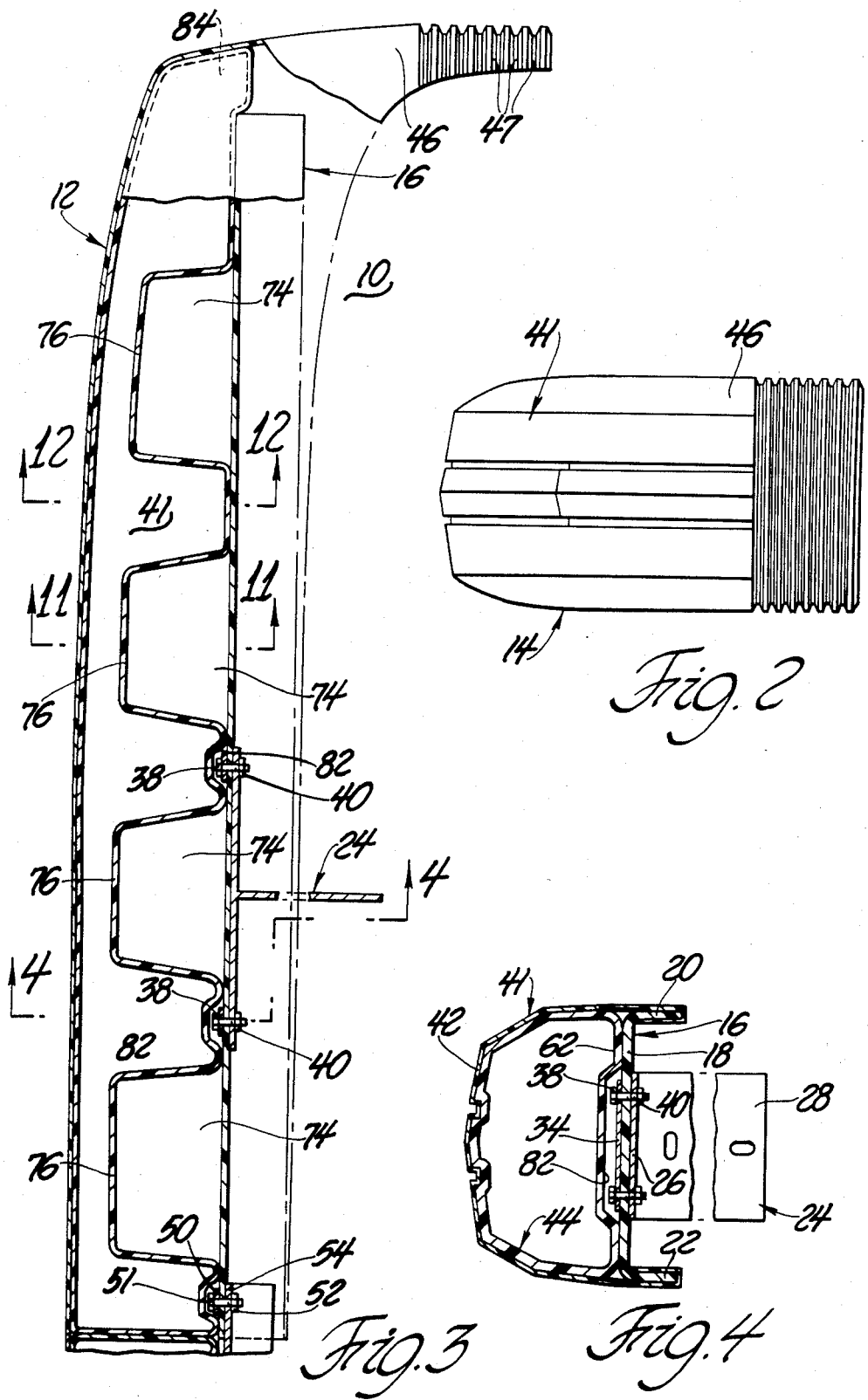

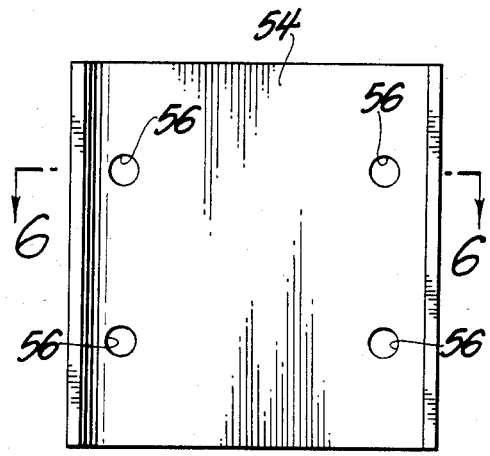
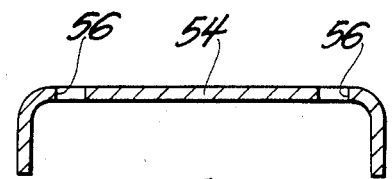
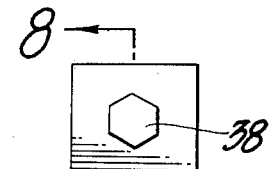
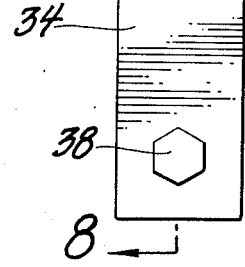
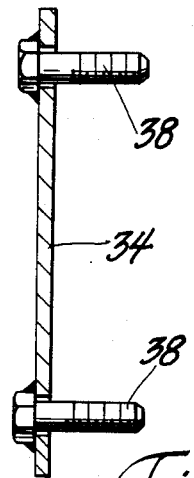
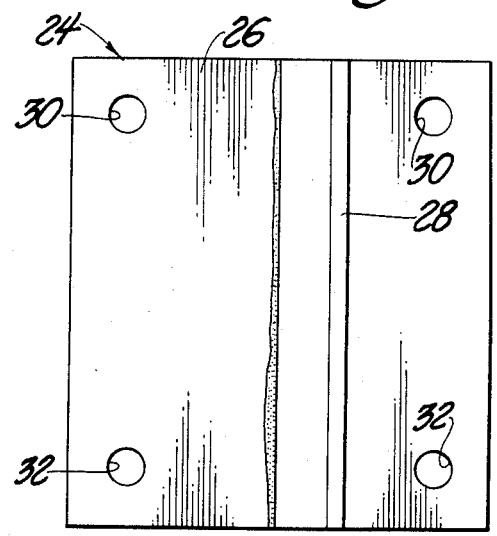
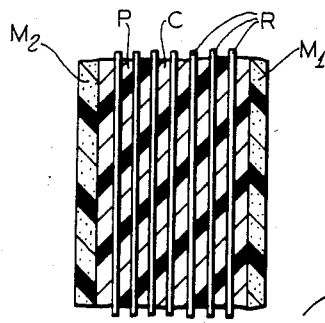

ENERGY ABSORBING VEHICLE BUMPER

TECHNICAL FIELD

The subject matter of the present invention is an energy absorbing vehicle bumper of a type useful with heavy duty vehicles and particularly on buses. The bumper system of the present invention is generally of the type wherein an energy absorbing, hollow core element is formed of a relatively rigid though deflectable, high strength plastic material and which element is mounted in front of and upon a relatively stiff transverse support beam member which is, in turn, adapted to be secured to a vehicle frame through a suitable rearwardly extending bracket structure.

Today most bus bumper systems are designed to withstand essentially the same type of collision requirements under conditions which will prevent damage to the bus or vehicle as well as to the bumper system. However, the specific manner in which such bumper systems have been constructed varies considerably one from the other and, in general, have resulted in complicated, costly, and in many cases, relatively heavy systems.

It is the purpose of the present invention to provide a greatly simplified bumper system and one which is significantly lighter than systems able to withstand comparable collision impact forces.

While the bumper system of the present invention is greatly simplified and of considerably reduced weight, it is intended to meet the following typical performance standards for a front or rear mounted bus bumper: (1) it shall withstand permanent damage and bumper component deterioration when impacted repeatedly into a fixed, full-height barrier at not less than 5 m.p.h.; (2) it shall be capable of withstanding a 5 m.p.h. impact into a fixed, full-height barrier without damage to the bus or to the energy absorbing bumper system; (3) the bumper system shall be capable of withstanding a 10 m.p.h. head-on impact by a 4,000 lb. post-1973 U.S. type passenger car without damage to the stopped bus, the energy absorbing bumper system or the car; (4) the bumper system shall be capable of withstanding an 8 m.p.h. impact by a 4,000 lb. post-1973 U.S. type passenger car at a 30° angle with no damage to the bus; and (5) the front bumper shall be capable of withstanding a 25 m.p.h. impact by the bus into the rear of a 4,000 lb. post-1973 U.S. type passenger car without damage to the bus structure or to the energy absorbing bumper.

BACKGROUND ART

While heavy duty bumper systems have been built which are capable of meeting the above noted collision impact requirements, they have normally been relatively complicated of design and therefore costly to manufacture as well as being heavier than is to be desired.

The present bumper system is a companion to the one shown in my application Ser. No. 528,403 "Energy Absorbing Vehicle Bumper" filed Sept. 1, 1983, now U.S. Pat. No. 4,509,782. It has been found that by using a relatively rigid, though deflectable, hollow core element formed of a high strength plastic in place of a resilient foam core material several advantages inhere. First, by utilizing a unique core element design the bumper system can absorb higher impact loads before experiencing damage to system components. More specifically, the present bumper system can absorb higher impact loads than my earlier system before breaking or rupturing the energy absorbing core element. Next, the uniquely configured, hollow core element has further reduced the weight of the bumper system as well as simplifying its construction.

In addition, the following patents are illustrative of bumper systems which have been designed to perform in environments similar to that of the subject invention:

U.S. Pat. No. 3,897,095 "Resilient Bumper Assembly"—Glance et al

U.S. Pat. No. 3,902,748 "Pneumatic Energy Absorbing Bumper System For Motor Vehicles"—Bank et al U.S. Pat. No. 3,989,292 "Semi-Pneumatic Energy Absorbing Bumper System For Motor Vehicles"—Bank et al U.S. Pat. No. 4,103,951 "Semi-Pneumatic Energy Absorbing Bumper System For Motor Vehicles"—Bank et al None of the foregoing structures disclose or suggest applicant's unique bumper system.

DISCLOSURE OF THE INVENTION

The subject invention generally relates to an energy absorbing vehicle bumper system of the type including horizontally extending support beam means intended to span the width of the vehicle such as a bus. Bracket members are provided for mounting the bumper system to the vehicle. Energy absorbing means are mounted upon the beam on the front side thereof and opposite from the bracket members. The energy absorbing means includes a relatively rigid though deformable, hollow core element molded from a high strength plastic material which is enclosed by an elastomeric outer cover means. The subject bumper systems include the following unique features. First, the support beam means comprises a pair of identical and, therefore, modular beam members adapted to be centrally joined at their horizontally inner ends. Each support beam has a generally U-shaped cross-section which includes a vertical wall portion and a pair of short horizontal leg portions which project rearwardly from the upper and lower endges of the vertical wall portion. The hollow core element is secured, as by adherence, to the front face of the vertical portion of the support beam. Bolt members are supported upon each beam member such that their threaded shanks project rearwardly through aligned holes in the vertical wall portion of the beam and an associated bracket member. An elastomeric cover means is molded about and encloses each support member and the energy absorbing core element. While other high strength or engineered plastic materials which are both relatively rigid and yet deflectable may be used for the core element, a preferred material is a polycarbonate/polybutylene terephthalate alloy developed and marketed by General Electric under the trademark XENOY.

It is an important part of the present invention in both meeting the required collision standards as well as reducing weight and simplifying the overall design and construction of the bumper system that the support beams are formed of a composite reinforced plastic material and preferably such as made by what is known as the "pultrusion" process. As will be considered in detail below, the pultruded support beams of the present invention have been designed in such a way as to cooperate with the hollow and deformable energy absorbing means to attain the desired collision resisting loads and weight objectives.

Additionally, the invention includes a uniquely simplified system for both joining the support beams as well as for mounting the bracket members to each of the support beams.

The details of the invention are set forth in the drawings and the description which follows:

BRIEF DESCRIPTION OF DRAWINGS

FIG. 2 is an end view along line 2—2 of FIG. 1;

FIG. 3 is a horizontal section through one of the bumper modules;

FIG. 4 is a cross-sectional view along line 4—4 of FIG. 3;

FIGS. 5 and 6 are respectively plan and elevational views of the module joining plate;

FIGS. 7 and 8 are respectively plan and side elevational views of the bolt mounted bracket fastening strip plate;

FIG. 9 is a schematic representation of the cross-sectional construction of the pultruded support beam;

FIG. 10 is an end view of the bumper mounting bracket;

BEST MODE FOR CARRYING OUT THE INVENTION

Figure 1:
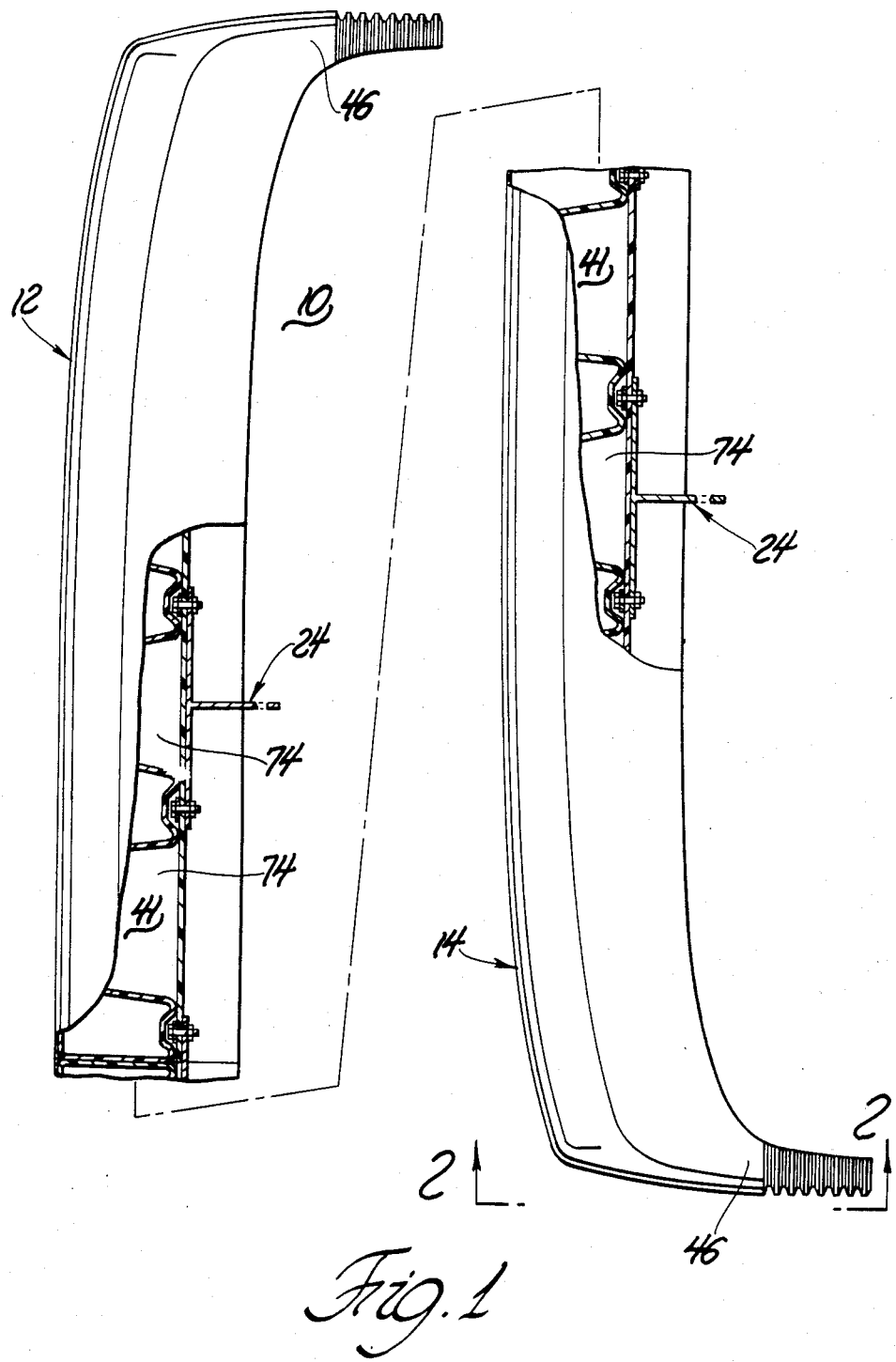
FIG. 1 is a partially sectioned plan view of the bumper structure.

While the system may be used for any heavy duty vehicle, it will hereinafter be referred to as being used with a bus. Referring particularly to FIGS. 1 through 4, the bumper system is indicated generally at 10 and is comprised of two substantially identical module portions 12 and 14 adapted to be suitably joined centrally to form an integrated bumper system adapted to span the front of a bus. Inasmuch as the bumper modules 12 and 14 are substantially identical, only module 12 will be described with the corresponding elements of module 14 being indicated with the same numbers plus a prime mark.

Each bumper module includes a U-shaped support beam 16 which, as seen in FIG. 4, includes a central wall portion 18 adapted to be mounted in a vertical position and a pair of relatively short leg portions 20 and 22 adapted to project horizontally rearwardly from the upper and lower ends of the vertical wall portion.

Each module 12 is adapted to be mounted to the bus frame structure, not shown, through an appropriate bracket member 24. Referring to FIGS. 4 and 10, bracket member 24 is generally of a T-shape and includes a top or forward portion 26 and a central leg portion 28. Bracket portions 26 and 28 are adapted to be mounted in a vertical position. Referring to FIG. 10, bracket portion 26 includes two sets of vertically spaced holes 30 and 32 formed therethrough and transversely spaced on either side of leg portion 28. Corresponding holes are formed through the vertical wall portion 18 of support beam 16. When bracket 24 is secured to the appropriate bus frame structure through leg portion 28, said leg portion extends rearwardly substantially parallel to the longitudinal axis of the vehicle.

As best seen in FIGS. 3, 4, 7 and 8, a vertically disposed metal strip plate 34 has threaded bolt members 38 tack welded or otherwise fixed thereto such that a pair of the plates abut against the forward face of the support beam wall portion 18 with the threaded shanks of the bolts projecting through the aligned beam and bracket holes such that bracket member 24 may be joined to module 12 by suitable nut means 40.

The bumper impact forces are transmitted through a relatively rigid, though deflectable, hollow energy absorbing structure, indicated generally at 41, to the deflectable support beam 16 and bracket 24 to the vehicle frame. Thus, a portion of the initial impact load is dissipated by the energy absorbing structure 41 which includes an elastomeric cover member or outer skin 42 which is molded about a rigidly deflectable element 44 as well as about the horizontal legs 20-22 of support beam 16.

The outer skin or cover 42 is formed of any suitable elastomeric material such as neoprene, high density urethane, or the like, and must be of such a quality and thickness as to resist puncturing by the impingement of a ¼ inch spherically radiused rod thrust endwise into the bumper with a thrust of not less than 350 pounds. In the illustrated embodiment, cover skin 42 has a thickness of about 3/16 inch. A most satisfactory material is a self-skinning urethane having a density of 60 pounds per cubic foot. One such material is available from Mobay Chemical and is identified as 110-25. Tape 43 is adhered along the top and bottom junctures of beam 16 and element 44 to prevent the skin 42 from penetrating between the beam and element when the skin is molded thereabout.

The details of the energy absorbing means 41 may best be appreciated by reference to FIGS. 3, 4, 11 and 12. The energy absorbing means includes the hollow core element 44 which is formed of a high strength plastic material having the physical characteristic of being both rigidified and yet being deflectable under impact loads as during a collision. A preferred material is a polycarbonate/polybutylene terephthalate alloy which is a proprietary material developed by the General Electric Corporation and marketed under the trade name XENOY. Typical properties for this material are as follows:

Specific Gravity: 1.19
Specific Volume, In$^3$/LB: 23.3
Tensile Strength, PSI: 7,000
Flexural Strength, PSI: 10,000
Flexural Modulus, PSI: 290,000
Notched Izod, FT-LBS/In
  @ Room Temperature: 13
  @ −30° C.: 10
Gardner Impact, In-LBS
  @ Room Temperature: 400
  @ −30° C: 400

In the embodiment of the invention shown in the drawings, the wall thickness of element 44 is in the range of 0.200 to 0.300 inches. The hollow element is formed by the blow molding process which results in an integral and completely enclosed structure.

Not only is it important to form element 44 of a high strength structural plastic having the general physical characteristics already noted, it is also important to the success of the subject bumper system that the member have a unique configuration. More specifically, element 44 includes a generally planar rear wall 62 having a vertical height substantially the same as the vertical height of support beam 16. Element 44 is supported upon beam 16 most preferably by adhering rear wall 62 to the front face of support beam 16. Element 44 also includes a front wall indicated at 64 and which front and rear walls are connected by top and bottom walls 66 and 68. Front wall 64 includes a pair of horizontally extending recesses 70 and 72 which are provided predominantly for decorative purposes.

Figure 11:
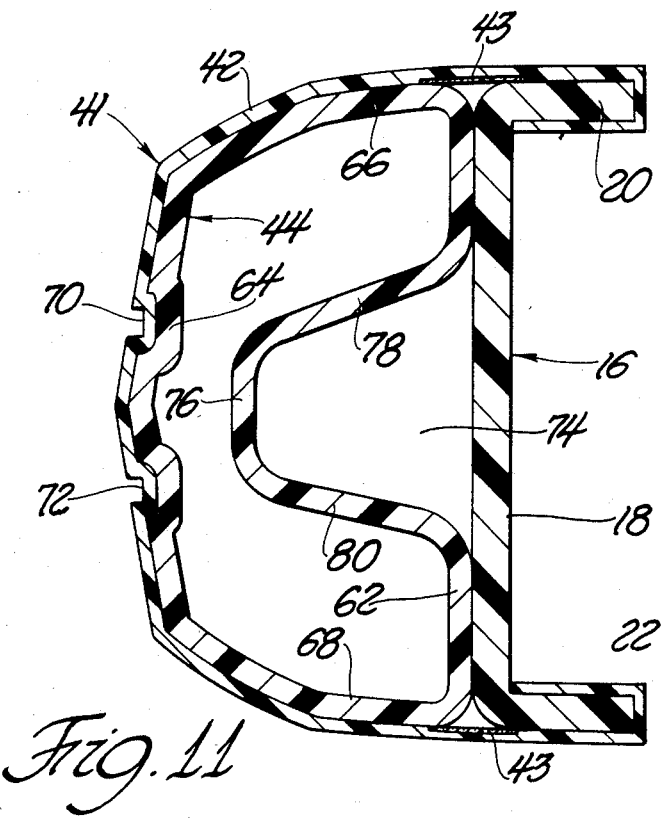
FIG. 11 is a sectional view along line 11—11 of FIG. 3.
Figure 12:
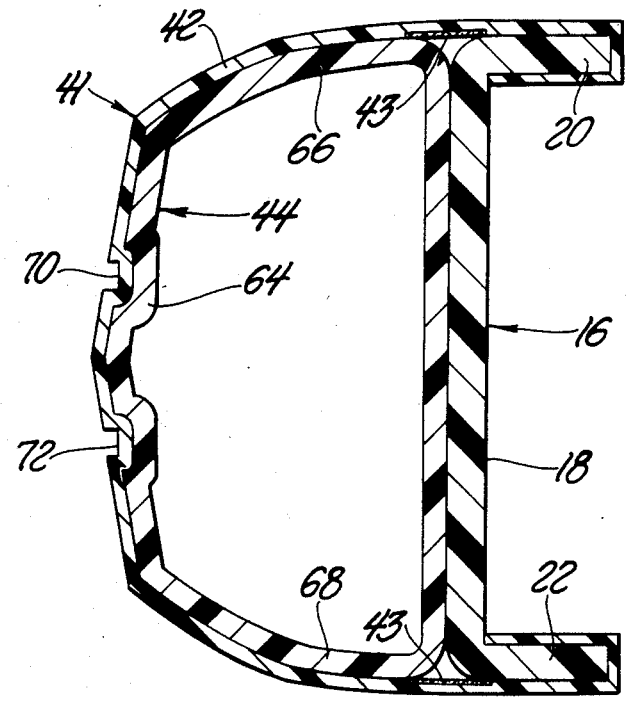
FIG. 12 is a sectional view along line 12—12 of FIG. 3.

As best seen in FIGS. 3 and 11, a plurality of cavities 74 are formed in the rear wall 62 of element 64. Incidentally, and as best seen in FIG. 11, element 44 is symmetrical in cross-section and as viewed about a horizontal plane vertically midway of rear wall 62. Likewise, the cavities 74 are of a symmetrical shape about the same horizontal plane.

The cavities 74 are horizontally elongated, as seen in FIG. 3, and include a generally C-shaped cross-section as viewed in FIG. 11. Each cavity includes a front wall portion 76 and a pair of rearwardly diverging legs 78 and 80 which terminate in rear wall 62. Again as seen in FIG. 11, front wall portion 76 of cavity 74 terminates proximate the front wall 64 of element 44 and extends forwardly approximately one-half to two-thirds of the distance between the rear wall 62 and the front wall 64.

The proximal positioning of cavity wall portion 76 in relation to front wall 64 is important in that the cavity structures provide a part of the energy absorbing function required of element 44. More specifically, under a sufficiently large impact load, front wall 64 of element 44 will be deflected rearwardly until such time as said wall engages the front wall portion 76 of cavity 74 at which time further rearward deflection of the front wall is resisted by the cavity structures. In particular, as front wall 64 is moved rearwardly into engagement with the cavities, the cavity legs or walls 78 and 80 will be deflected or bent vertically outwardly to absorb the energy of the impact. It is also to be noted that the rearward opening of each cavity 74 is approximately one-third the overall vertical height of element 44.

Thus, the cavity arrangement of element 44 provides an overall reinforcement of the element and also provides a second step of resistance to rearward deflection of the front wall 64 of the element.

As already noted, fastening means are provided for mounting transverse beam member 16 to the vehicle body through T-shaped support bracket 24. As best seen in FIGS. 3 and 4, the planar rear wall 62 of element 44 is provided with vertically extending recess 82 disposed between adjacently spaced cavities 74. The fastening means plate 34 and head of stud 38 are adapted to project within the recess 82 and thereby not interfere with the bonding of element 44 to the support beam 16.

In order to provide protection for the side of the bus in the area of the bumper, each module is molded with a trailing or cantilevered portion 46 formed at the outermost end thereof in such a way as to project rearwardly of the vehicle. It is to be noted that the rearmost section of trailing portion 46 has been corrugated as at 47 whereby the length of the trailing portion may be reduced by cutting off any unneeded portion thereof. As best seen in FIG. 3, outer ends 84 project laterally beyond beams 16 and thereby support contilevered portions 46 facilitating the protection of the front corners of the bus.

In order to join the bumper modules 12 and 14, suitable holes are formed through the vertical wall portions 18 of the support beams adjacent their horizontally innermost ends. Strip 50 and mounted bolts 51, identical to 34 and 38 described above, project rearwardly through the vertical wall portion holes so that their threaded shank portions may be engaged by suitable nut elements 52. As best seen in FIGS. 5 and 6, a common C-shaped plate 54 is provided for joining the bumper modules at their inner ends. Holes 56 are formed in plate 54 corresponding to the beam holes and adapted to receive bolts 51 which project rearwardly to be engaged by the nut elements 52 thereby joining the modules.

PREFERRED EMBODIMENT

The ultimate objective of the subject bumper system is to achieve the lightest weight and simplest structure able to withstand the required, supra, collision impact loads in a manner to avoid damage to the system and the bus. In view of its numerous advantages, including weight and strength, as compared to other high strength materials, it is most preferred to use a fiberglass reinforced plastic material for the support beam members 16 and 16'. More specifically, such a material is preferably made by the well known "pultrusion process". Referring to the schematic representation of FIG. 9, the support beam material comprises a thermosetting resin, e.g. polyester, impregnated fiberglass laminated composite having a core element C and outer layers $M_1$ and $M_2$. Core element C consists of a plurality of linear and generally parallel roving elements R which extend along the transverse length of beam 16. Core element C comprises approximately 75% of the thickness of the beam material. The outer overlaying layers $M_1$ are of a mat or woven construction. Each of the layers $M_1$ and $M_2$ comprises approximately 12.5% of the thickness of the composite beam material. Core C and outer layers $M_1$ and $M_2$ are completely impregnated with a thermosetting resin P, supra, to provide a suitable composite matrix.

In the preferred embodiment, the overall cross-section thickness of the composite beam material is approximately 0.625 inch. Dimensionally, the vertical wall portion 18 of beam 14 is approximately 10 inches while leg portions 20 and 22 are approximately 3 inches in length.

Referring to FIG. 4, the covered element 44 projects about 8 inches beyond or forwardly of vertical portion 18 of beam 16.

While the transverse length of the bumper is determined by the bus width, each module 12 and 14 is typically 48 or 51 inches in length. Likewise, the angle between the bumper modules, i.e. as viewed in FIGS. 1 and 3, is determined by the front end shape of the bus. As illustrated, each module is inclined rearwardly from its horizontal inner end at an angle of about 6°.

As illustrated, the various plates and brackets are preferably formed of ⅜ inch steel.

Exclusive of external bracketry and mounting hardware, the lightest energy absorbing bus bumpers have heretofore weighed about 160 pounds. The subject bumper weighs approximately 130 pounds or is about 25% lighter than known bus bumpers when built as depicted in the preferred embodiment.

It is apparent that other modifications of the energy absorbing bumper system may be made within the intended scope of the invention as set forth in the hereinafter appended claims.

What is claimed is:

1. An energy absorbing vehicle bumper system of the type including a pair of identical beam members (16) adapted to be joined by a common plate member (54) at their horizontally inner ends to provide a bumper support structure for spanning the front end of a vehicle, bracket means (24) for mounting said beams to the vehicle, and energy absorbing means (41) supported upon said beam on the side thereof opposite from the bracket means, said energy absorbing means including a deflectable member (44) enclosed by an elastomeric outer cover means (42), the improvement comprising:

A. each beam (16) having a generally U-shaped cross-section with a vertical wall portion (18) and a pair of horizontal leg portions (20 and 22) projecting rearwardly from the upper and lower edges of the vertical wall portion and away from said energy absorbing means;
B. the energy absorbing means (41) comprising a hollow, rigidified and deflectable structural member (44) having
   (1) a rear wall secured to the front face of the vertical wall portion (18) of said beam member;
   (2) a front wall (64) spaced forwardly of said rear wall;
   (3) top and bottom walls (66 and 68) joining said front and rear walls;
   (4) a plurality of horizontally spaced cavities (74) formed in said rear wall and extending toward said front wall (64);
C. fastening means (34–40) for securing said beam members to said bracket means; and
D. said elastomeric cover means (42) being molded about and enclosing the energy absorbing means and at least a portion of the cooperating beam member.

2. An energy absorbing bumper system as set forth in claim 1 wherein said energy absorbing means is a high strength plastic material having a flexular modulus of approximately 290,000 PSI.

3. An energy absorbing bumper system as set forth in claim 1 wherein each of said cavities (74) projects from said rear wall (62) toward the front wall (64) and terminates in a cavity wall portion (76) proximately spaced from said front wall such that upon rearward deflection said front wall will engage said proximate cavity wall portion to resist rearward deflection of the front wall.

4. An energy absorbing bumper system as set forth in claim 1 wherein said energy absorbing means (41) is generally symmetrical about a horizontal plane generally midway of the height of said rear wall, each of said cavities (74) also being generally symmetrical about said horizontal plane and including a wall portion (76) proximately spaced from the front wall (64) such that upon rearward deflection said front wall will engage said proximate cavity wall portion to resist further rearward deflection of the front wall.

5. An energy absorbing bumper system as set forth in claim 4 wherein each cavity (74) has a generally elongated C-shaped cross-section in a vertical plane, said proximate wall portion (76) of the cavity comprises the closed end of said C shape, each cavity including rearwardly diverging legs (78 and 80) extending from the proximate wall portion to said rear wall (62).

6. An energy absorbing bumper system as set forth in claim 5 wherein the proximate wall portion (76) of each cavity extends forwardly from one-half to two-thirds of the distance between said rear (62) and front (64) walls.

7. An energy absorbing bumper system as set forth in claim 1 wherein said rear wall (62) includes a pair of vertically extending recesses (82) each disposed between a pair of adjacent cavities (74), one end of each of said fastening means (38) projecting within one of said recesses.

8. An energy absorbing bumper system as set forth in claim 7 wherein the fastening means includes elongated strips (34) each having spaced openings, stud means (38) projecting through said openings and having heads secured to said strip, each strip and associated stud heads projecting within one of said recesses (82).

* * * * *